(12) United States Patent
Dunivan

(10) Patent No.: US 12,356,997 B2
(45) Date of Patent: Jul. 15, 2025

(54) BANDSAW AUTOMATED PORTIONING SAW SYSTEM WITH VISUAL FEEDBACK AND METHOD OF USE

(71) Applicant: Steve Dunivan, Amarillo, TX (US)

(72) Inventor: Steve Dunivan, Amarillo, TX (US)

(73) Assignee: Midwest Machine, LLC, Amarillo, TX (US)

( * ) Notice: Subject to any disclaimer, the term of this patent is extended or adjusted under 35 U.S.C. 154(b) by 372 days.

(21) Appl. No.: 18/155,606

(22) Filed: Jan. 17, 2023

(65) Prior Publication Data

US 2023/0248008 A1   Aug. 10, 2023

Related U.S. Application Data

(63) Continuation-in-part of application No. 16/776,413, filed on Jan. 29, 2020, now abandoned.

(51) Int. Cl.
  *A22C 17/00* (2006.01)
  *B23D 53/00* (2006.01)
  *B23D 59/00* (2006.01)

(52) U.S. Cl.
  CPC ........ *A22C 17/0086* (2013.01); *B23D 53/008* (2013.01); *B23D 59/001* (2013.01)

(58) Field of Classification Search
  CPC .................................................. A22C 17/0086
  See application file for complete search history.

(56) References Cited

U.S. PATENT DOCUMENTS

| | | | | |
|---|---|---|---|---|
| 3,916,484 A | * | 11/1975 | Kennedy | A22B 5/0058 452/159 |
| 4,601,083 A | * | 7/1986 | Shoji | A22C 25/142 452/157 |
| 4,738,004 A | * | 4/1988 | Lapeyre | A22C 17/0086 452/158 |
| 5,937,080 A | * | 8/1999 | Vogeley, Jr. | B26D 7/30 382/110 |
| 6,129,625 A | * | 10/2000 | Cate | A22C 17/0086 452/158 |
| 6,563,904 B2 | * | 5/2003 | Wijts | A22C 17/0086 83/72 |
| 7,153,203 B2 | * | 12/2006 | Pfarr | B23K 26/0838 83/72 |
| 7,373,217 B2 | * | 5/2008 | Young | B26D 7/30 700/95 |
| 7,976,368 B2 | * | 7/2011 | Haucke | A22C 25/18 452/184 |

(Continued)

*Primary Examiner* — Sean M Michalski
(74) *Attorney, Agent, or Firm* — Shannon Warren

(57) ABSTRACT

An automated saw wherein: the automated saw comprises one or more visual sensors, a meat positioning assembly. The automated saw is configured to analyze an uncut meat and calculate one or more cutting depths for one or more cut portions from the uncut meat. The uncut meat comprises a first end and a second end. The first end of the uncut meat can be analyzed by the automated saw by: capturing a first slice image of the first end, locating a first bone configuration and a configuration of one or more meat portions in relation to the first bone configuration, and measuring portions of the one or more meat portions to categorize which among one or more cuts of meat is presented at the first end of the uncut meat. The automated saw calculates a first cutting depth for a first meat portion.

12 Claims, 12 Drawing Sheets

(56) References Cited

U.S. PATENT DOCUMENTS

| | | | | |
|---|---|---|---|---|
| 8,147,299 | B2* | 4/2012 | McKenna | A22C 17/008 |
| | | | | 452/155 |
| 8,412,366 | B2* | 4/2013 | Blaine | B26D 5/00 |
| | | | | 83/13 |
| 8,529,321 | B2* | 9/2013 | Weber | A22C 17/0086 |
| | | | | 452/134 |
| 8,758,099 | B2* | 6/2014 | Reifenhaeuser | B26D 5/007 |
| | | | | 452/157 |
| 9,285,213 | B2* | 3/2016 | Lindee | G01B 11/2545 |
| 9,913,483 | B2* | 3/2018 | Vuholm | G06T 7/13 |
| 12,108,768 | B2* | 10/2024 | McDonnell | A22C 17/0093 |
| 2002/0067797 | A1* | 6/2002 | Safai | A22C 17/10 |
| | | | | 378/54 |
| 2004/0153283 | A1* | 8/2004 | Wargon | A22C 17/0086 |
| | | | | 702/156 |
| 2005/0085176 | A1* | 4/2005 | Houtz | A22C 17/0086 |
| | | | | 452/157 |
| 2006/0161380 | A1* | 7/2006 | Bottemiller | A22C 7/0023 |
| | | | | 702/151 |
| 2007/0157776 | A1* | 7/2007 | Sorensen | B26D 5/00 |
| | | | | 83/73 |
| 2010/0304652 | A1* | 12/2010 | Bolte | A22C 17/0046 |
| | | | | 452/156 |
| 2012/0034349 | A1* | 2/2012 | Jing | G06T 7/155 |
| | | | | 426/231 |
| 2018/0029246 | A1* | 2/2018 | Blaine | B26F 3/004 |
| 2020/0068909 | A1* | 3/2020 | Blaine | G05B 19/4166 |
| 2020/0230721 | A1* | 7/2020 | Dunivan | B23D 59/001 |
| 2023/0013750 | A1* | 1/2023 | Thomas | G01N 1/04 |
| 2025/0000106 | A1* | 1/2025 | Kim | B25J 13/085 |

* cited by examiner

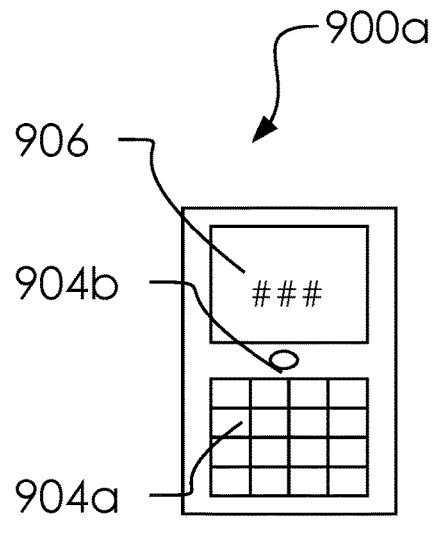
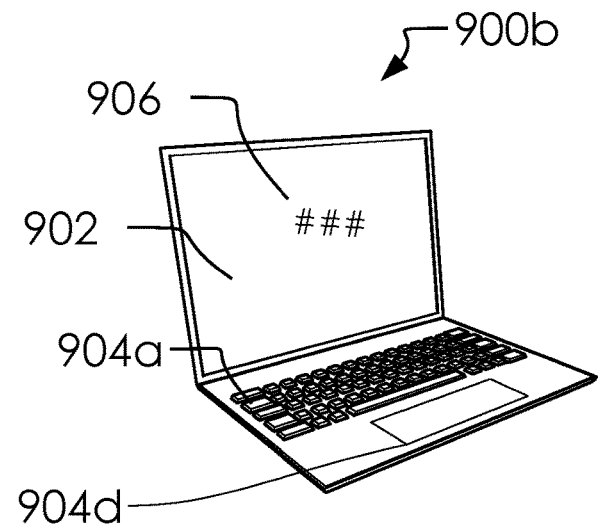
FIG. 9A　　　　　　　　　FIG. 9B
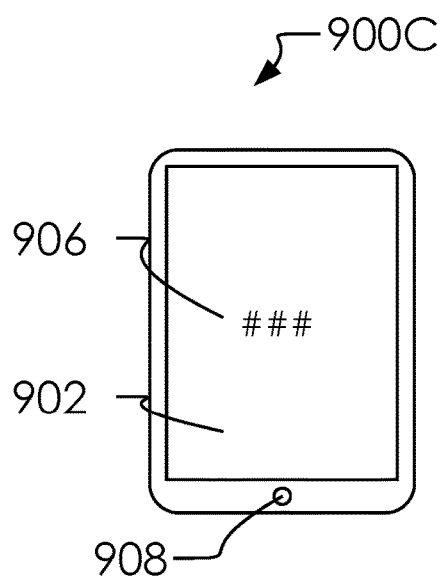
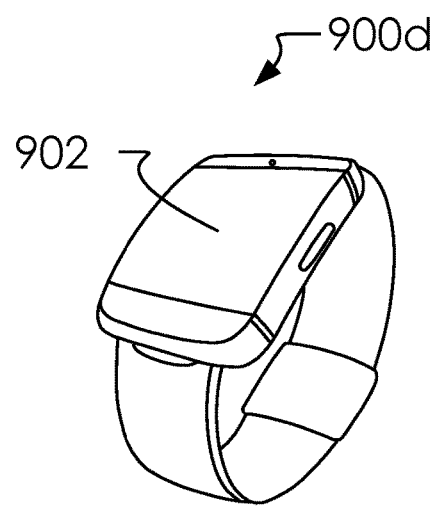
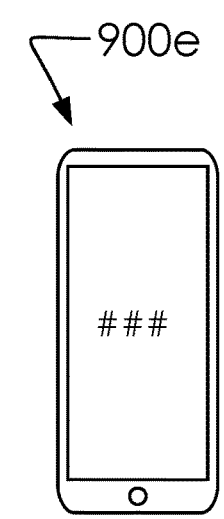
FIG. 9C　　FIG. 9D　　FIG. 9E

BANDSAW AUTOMATED PORTIONING SAW SYSTEM WITH VISUAL FEEDBACK AND METHOD OF USE

CROSS-REFERENCE TO RELATED APPLICATIONS

This application claims U.S. Patent Application No. 62/798,181 filed 2019 Jan. 29, Ser. No. 16/751,100 filed 2020 Jan. 23, 62/796,027 filed 2019 Jan. 23, and Ser. No. 16/776,413 filed 2020 Jan. 29.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

No prior art is known to the Applicant.

BRIEF SUMMARY OF THE INVENTION

An automated saw configured to analyze an uncut meat and calculate one or more cutting depths for one or more cut portions from said uncut meat based on a current cut of meat wherein: said automated saw comprises a controller and one or more visual sensors. Said controller comprises an address space, a processor and a memory. Said controller further comprises a device application stored in said memory and configured to be executed in said memory. Said uncut meat comprises a first end and a second end. Said device application is configured to analyze said uncut meat. Said first end of said uncut meat can be analyzed by said device application by: capturing a first slice image of said first end of said uncut meat using said one or more visual sensors, locating in said first slice image, one or more bone configurations and one or more meat portion configurations in relation to one another, and categorizing a current cut of meat categorization among one or more cuts of meat categorizations according to locations of said one or more bone configurations and said one or more meat portion configurations in said first slice image. Said one or more visual sensors comprises a first visual sensor and a second visual sensor. Said first visual sensor has an overview perspective of said uncut meat. Said device application is configured to calculate an uncut meat length of said uncut meat using images from said first visual sensor. Said second visual sensor comprises a view of said first end of said uncut meat length. Said automated saw captures an image of one or more slice images of said uncut meat length using said second visual sensor. Said device application is configured to calculate said one or more cutting depths for said one or more cuts of meat categorizations corresponding to a preference for each category of said one or more cuts of meat categorizations.

Said automated saw configured to analyze said uncut meat and calculate said one or more cutting depths for said one or more cut portions from said uncut meat based on a current cut of meat wherein: said automated saw comprises said controller and said one or more visual sensors. Said controller comprises said address space, said processor and said memory. Said controller further comprises said device application stored in said memory and configured to be executed in said memory. Said uncut meat comprises said first end and said second end. Said device application is configured to analyze said uncut meat. Said first end of said uncut meat can be analyzed by said device application by: capturing said first slice image of said first end of said uncut meat using said one or more visual sensors, locating in said first slice image, said one or more bone configurations and said one or more meat portion configurations in relation to one another, and categorizing a current cut of meat categorization among said one or more cuts of meat categorizations according to locations of said one or more bone configurations and said one or more meat portion configurations in said first slice image.

Said automated saw configured to analyze said uncut meat and calculate said one or more cutting depths for said one or more cut portions from said uncut meat based on a current cut of meat wherein: said automated saw comprises said controller and said one or more visual sensors. Said controller comprises said address space, said processor and said memory. Said controller further comprises said device application stored in said memory and configured to be executed in said memory. Said uncut meat comprises said first end and said second end. Said device application is configured to analyze said uncut meat. Said first end of said uncut meat can be analyzed by said device application by: capturing said first slice image of said first end of said uncut meat using said one or more visual sensors, locating in said first slice image, said one or more bone configurations and said one or more meat portion configurations in relation to one another, and categorizing a current cut of meat categorization among said one or more cuts of meat categorizations according to locations of said one or more bone configurations and said one or more meat portion configurations in said first slice image. Said automated saw using said device application is configured for analyzing said first end of said uncut meat by: capturing said first slice image of said first end, locating a first bone configuration and a configuration of said one or more meat portion configurations in relation to said first bone configuration, and measuring portions of said one or more meat portion configurations to categorize which among said one or more cuts of meat categorizations is presented at said first end of said uncut meat.

BRIEF DESCRIPTION OF THE SEVERAL VIEWS OF THE DRAWING

FIGS. 9A, 9B, 9C, 9D and 9E illustrate a mobile phone 900a, a personal computer 900b, a tablet 900c, a smart watch 900d and a smart phone 900e, respectively.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
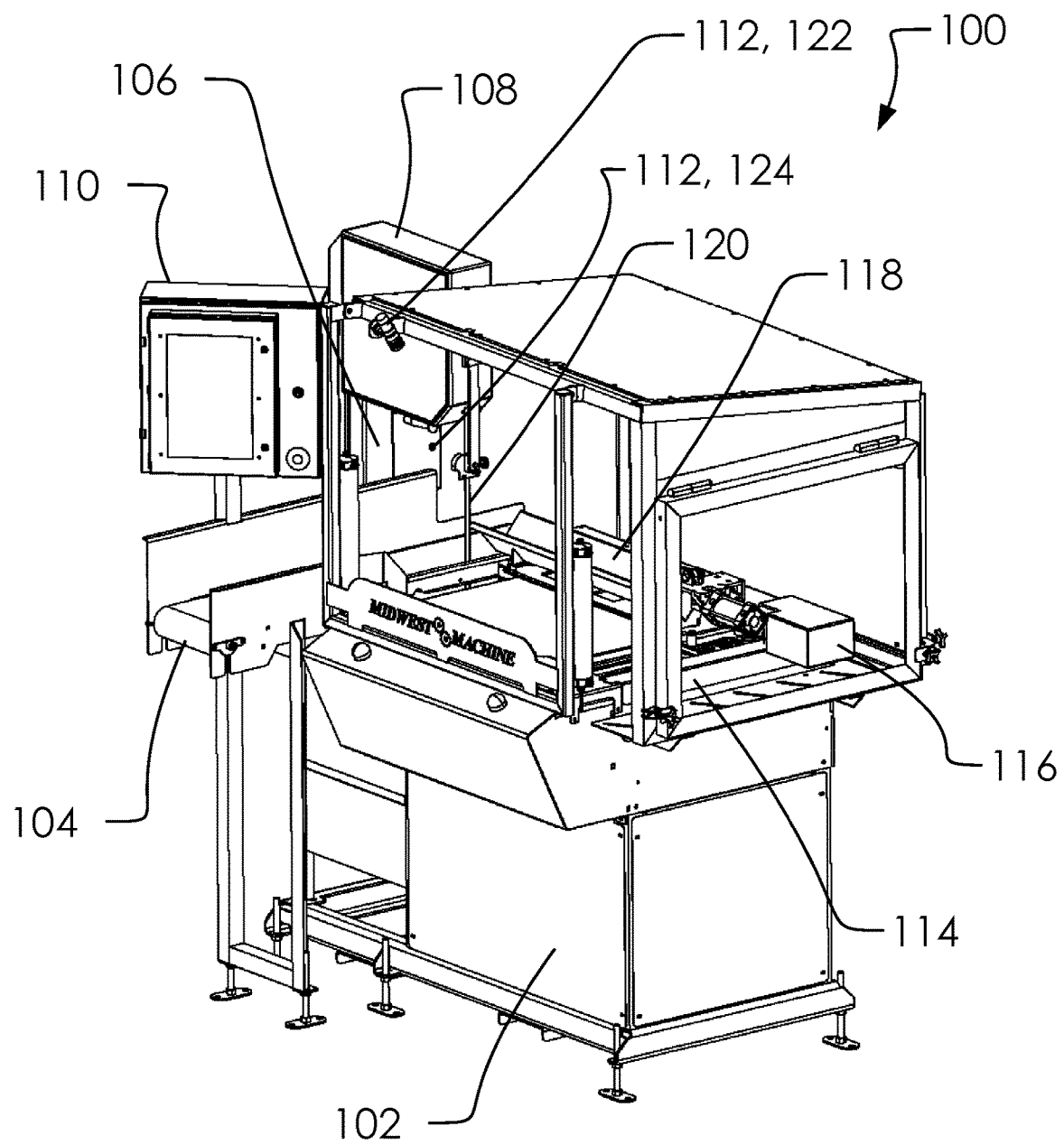
FIG. 1 illustrates a perspective overview of an automated saw 100.

FIG. 1 illustrates a perspective overview of an automated saw 100.

In one embodiment, said automated saw 100 can comprise a base 102, a conveyor 104, a post 106, an overhang portion 108, a controller 110, one or more visual sensors 112, a meat positioning assembly 114, a pusher 116, a tray 118 and a bandsaw blade 120. Said base 102 can comprise a lower portion of said automated saw 100 which supports said tray 118 and said meat positioning assembly 114. In one embodiment, said meat positioning assembly 114 can comprise a system which moves said tray 118 and said pusher 116 relative to other portions of said automated saw 100. In one embodiment, said conveyor 104 can transport elements having been cut by said bandsaw blade 120, as discussed below. In one embodiment, said tray 118 can move in two or three axes as dictated by said controller 110.

In one embodiment, said one or more visual sensors 112 can comprise a camera, as is known in the art. Said one or more visual sensors 112 can comprise a first visual sensor 122 and a second visual sensor 124. In one embodiment, said first visual sensor 122 can create an overview of said tray 118 and its contents, and said second visual sensor 124 can create a front-end view thereof.

In one embodiment, said controller 110 can comprise one among one or more computers 804. In one embodiment, said controller 110 can receive signals from said one or more visual sensors 112, said meat positioning assembly 114, others among said one or more computers 804 and/or a server 806 to determine movement of said meat positioning assembly 114 and movement of said bandsaw blade 120. As described below, said controller 110 being said one or more computers 804 therefore comprises an address space 1000, a processor 1002, a memory 1004 and a communication hardware 1006.

Figure 2:
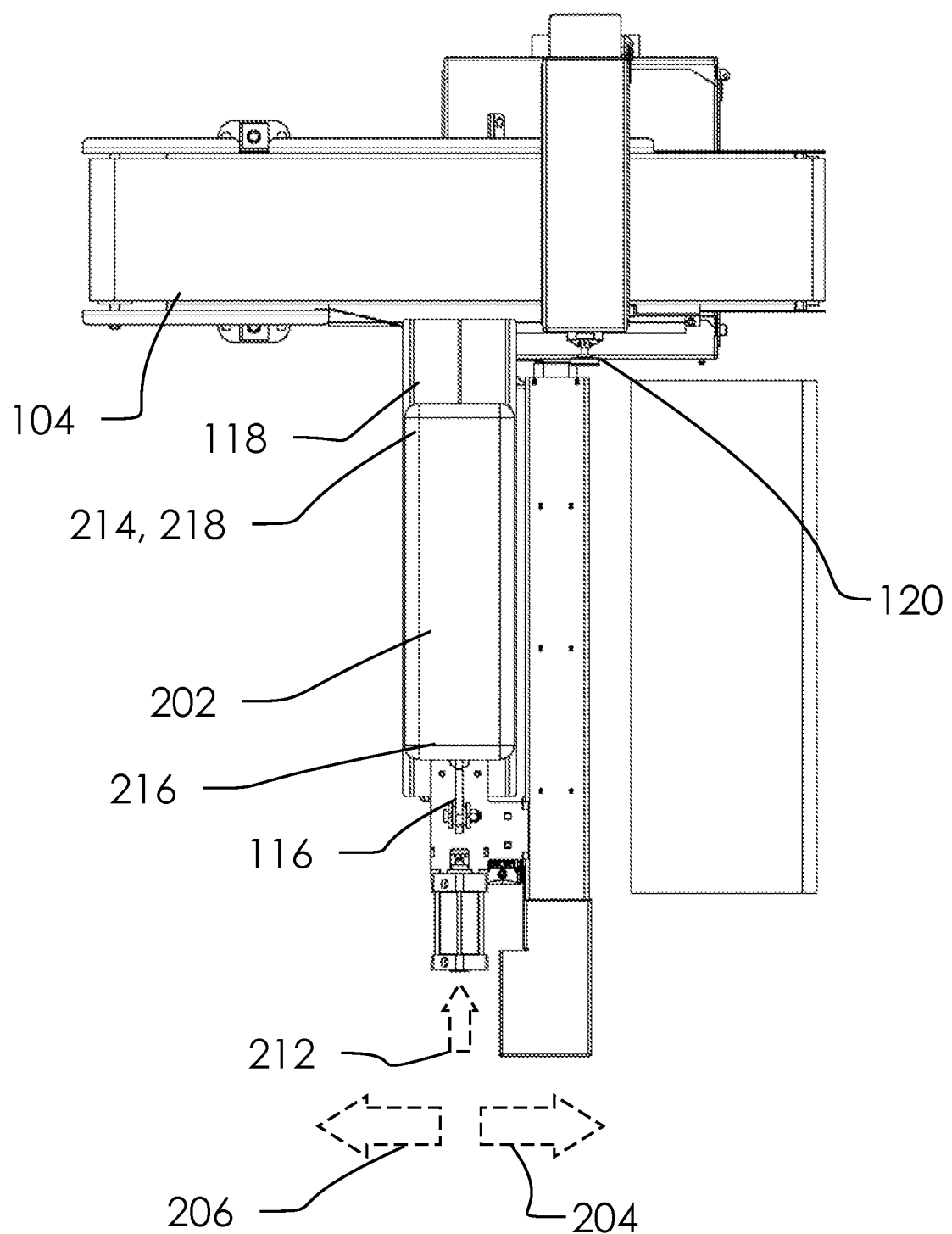
FIG. 2 illustrates a block diagram of portions of said automated saw 100.

FIG. 2 illustrates a block diagram of portions of said automated saw 100.

One objective of said automated saw 100 can be to control movement of an uncut meat 202 within a first horizontal direction 204 and a second horizontal direction 206; with the added control of movement of said uncut meat 202 relative to said tray 118 by pressing said uncut meat 202 with said pusher 116 in a pushing direction 212. In one embodiment, said meat positioning assembly 114 can move said uncut meat 202 forward and backward relative to said bandsaw blade 120 according to said pushing direction 212.

Said uncut meat 202 comprises a first end 214 and a second end 216. In one embodiment, said first end 214 comprises a cutting end 218 of said uncut meat 202.

Figure 3A:
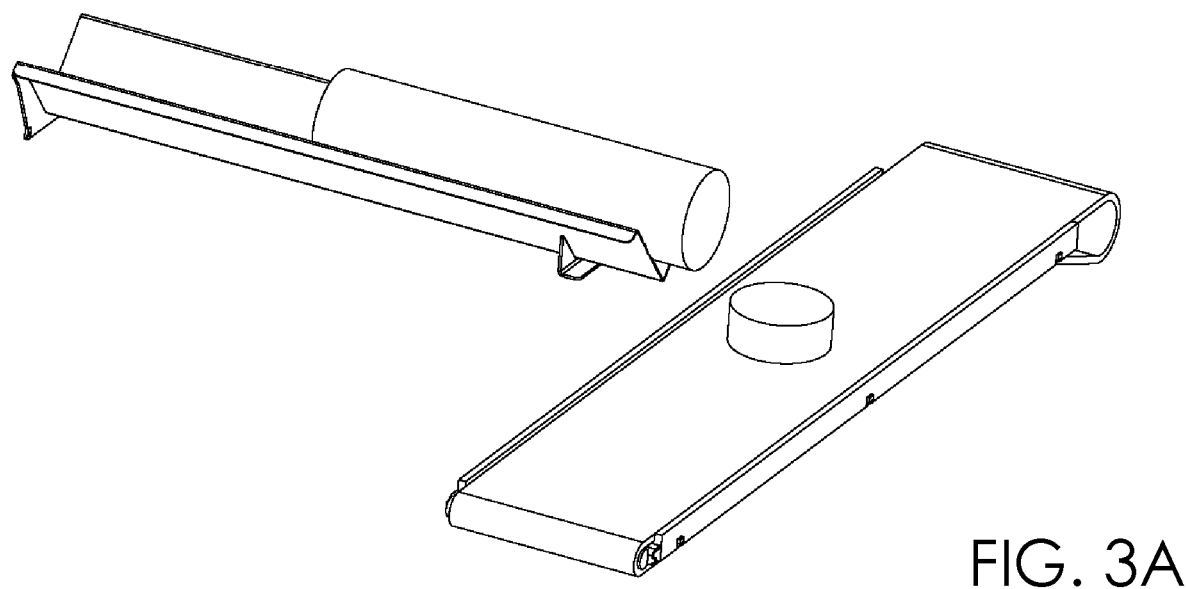
FIGS. 3A and 3B illustrate a back-side perspective overview of said automated saw 100 with a cutting plane 314 being calculated.
Figure 3B:
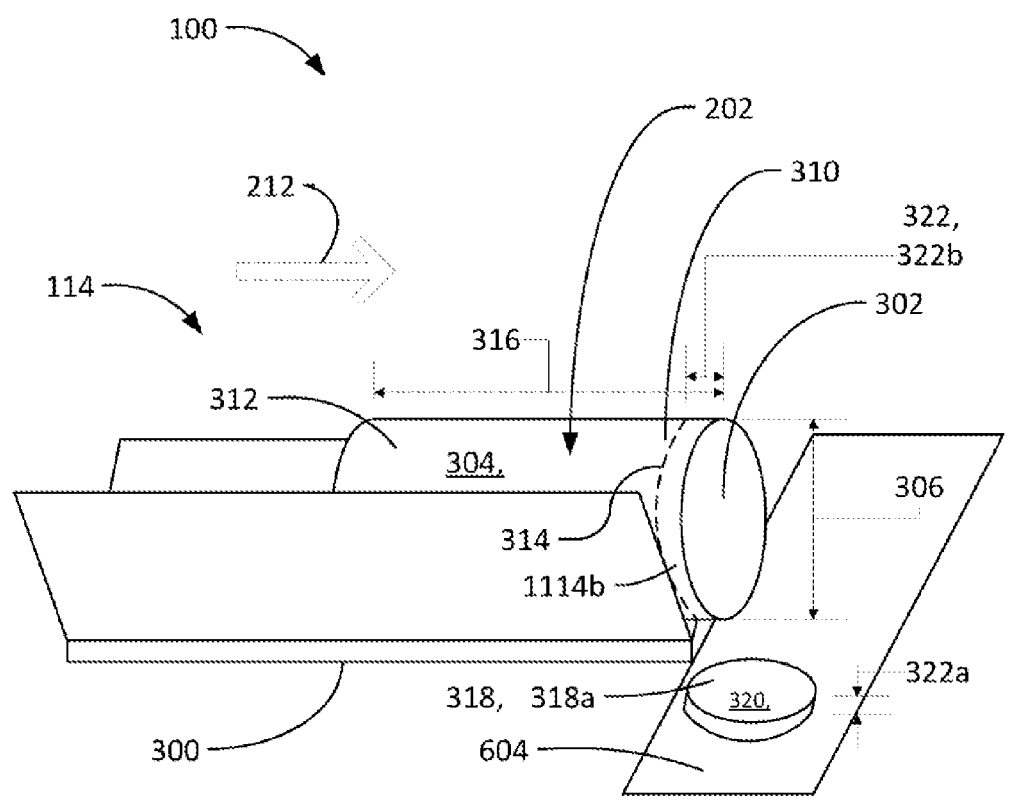

FIGS. 3A and 3B illustrate a back-side perspective overview of said automated saw 100 with a cutting plane 314 being calculated.

In one embodiment, said automated saw 100, with a device application 1200, can calculate a diameter 306, a surface area 302 and one or more cut portions 318 of said uncut meat 202. As a starting point, said device application 1200 can know an uncut meat length 316, said diameter 306 and an uncut meat weight 304 of said uncut meat 202 with a scale 300. Said device application 1200 can be configured for: calculating said cutting plane 314 by using said surface area 302 and said one or more cut portions 318 along with said uncut meat weight 304, said diameter 306 and said uncut meat length 316 to determine where to place said cutting plane 314 in order to cut said one or more cut portions 318.

In one embodiment, said one or more cut portions 318 can comprise at least a first cut portion 318a and a second cut portion 318b. Further, said one or more cut portions 318 can comprise a cut portion weight 320.

As illustrated, said automated saw 100 has already cut said first cut portion 318a, and has calculated said uncut meat length 316 from said uncut meat weight 304 and said uncut meat length 316 by dividing the desired quantity of said cut portion weight 320 for said second cut portion 318b by said uncut meat weight 304, then taking that fraction and multiplying it by said uncut meat length 316, the product of which comprises said one or more cut portions 318.

In another embodiment, said one or more cut portions 318 can be calculated by accounting for said surface area 302 where said uncut meat 202 is not consistently the same diameter as said diameter 306; wherein, said one or more cut portions 318 can be calculated by accounting for a volume and/or density of said uncut meat 202 along the entirety of said uncut meat length 316.

Figure 4:
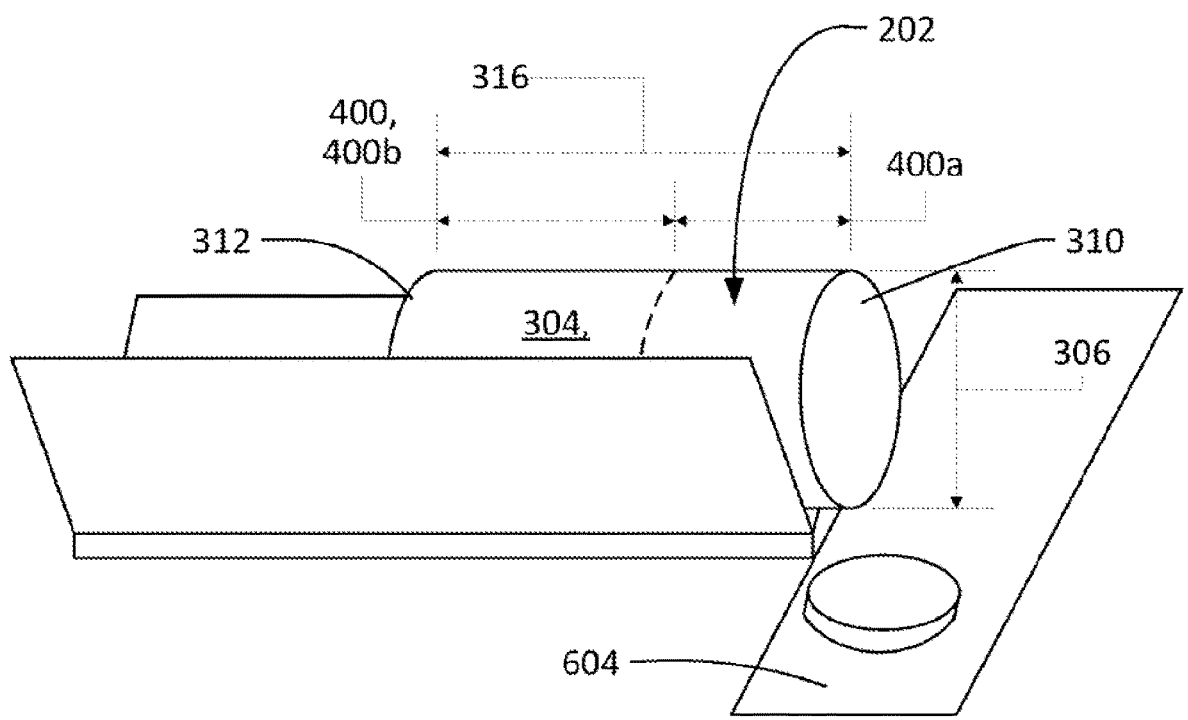
FIG. 4 illustrates a back-side perspective overview of said automated saw 100 with one or more cuts of meat 400 being shown.

FIG. 4 illustrates a back-side perspective overview of said automated saw 100 with one or more cuts of meat categorizations 400 being shown.

In one embodiment, said uncut meat 202 can comprise said one or more cuts of meat categorizations 400. For example, in one embodiment, a beef loin can comprise a porterhouse cut, and a T-bone cut which need to be treated differently. One feature of said automated saw 100 is to analyze each of said one or more cut portions 318 before slicing them from said uncut meat 202.

Said one or more cuts of meat categorizations 400 can comprise at least a first cut of meat 400a and a second cut of meat 400b.

Figure 5A:
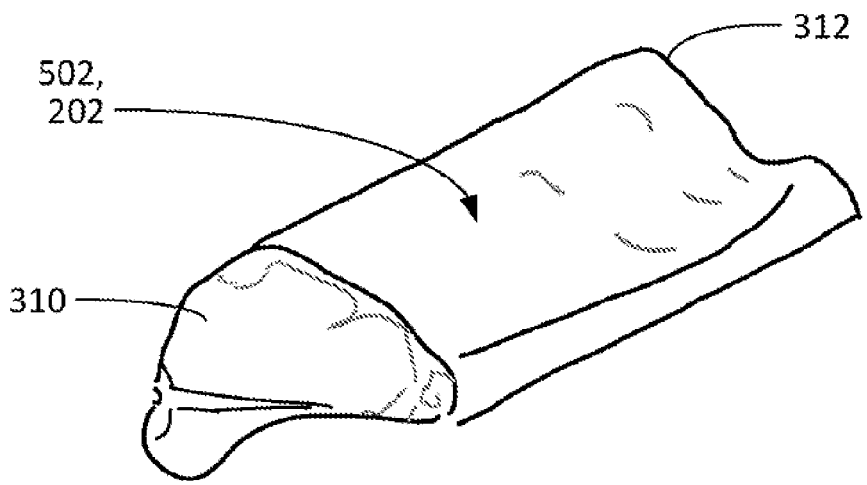
FIGS. 5A and 5B illustrate a perspective overview of an uncut meat 202, and a perspective overview of a first cut portion 318a and a second cut portion 318b, respectively.
Figure 5B:
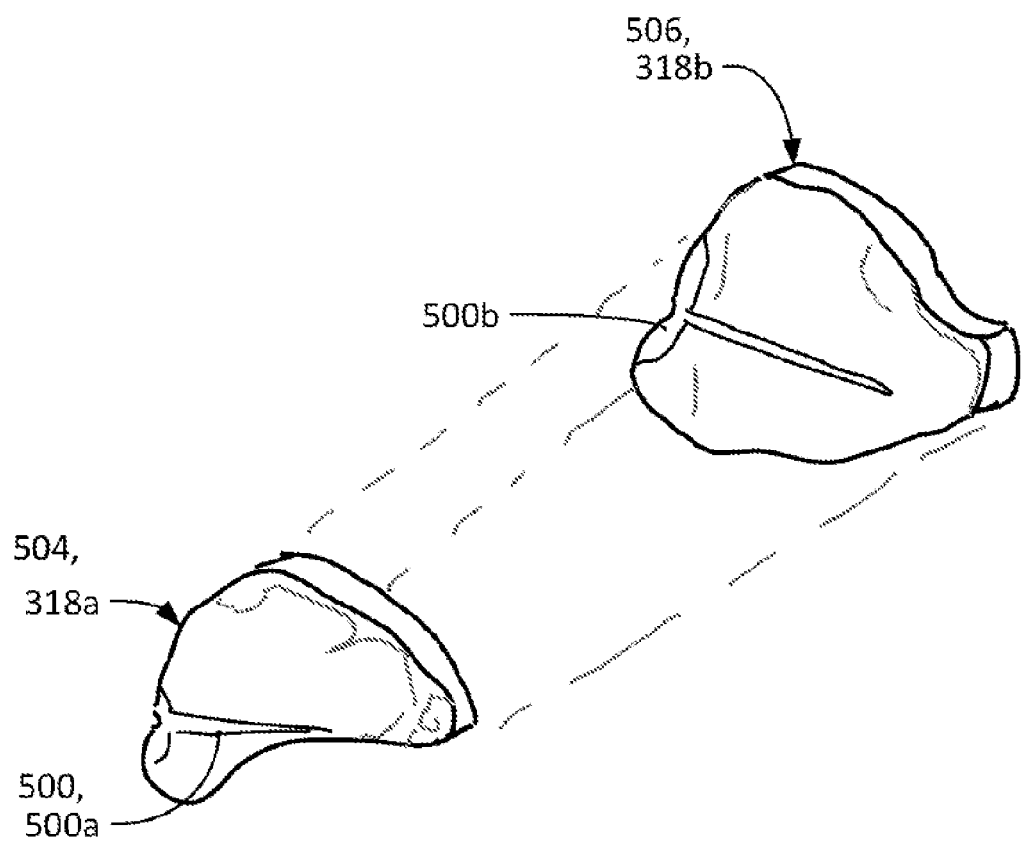

FIGS. 5A and 5B illustrate a perspective overview of said uncut meat 202, and a perspective overview of said first cut portion 318a and said second cut portion 318b, respectively.

Shown here are said uncut meat 202 as a short loin 502, said first cut portion 318a as a T-bone cut 504, and said second cut portion 318b as a porterhouse cut 506. However, said automated saw 100 can be used to cut other types of meat without varying from the current disclosure.

One feature of said automated saw 100, using said device application 1200, is to visually analyze each among said one or more cut portions 318 and determine what cut of meat is presented for cutting. In one embodiment, said automated saw 100 can visually inspect one or more bone configurations 500 and determine which cut of meat is presented (such as said T-bone cut 504 or said porterhouse cut 506). In one embodiment, said device application 1200 can be configured for: analyzing a current image among one or more slice images 600, characterizing aspects of and end portion of said uncut meat 202 to classify what cut of meat is presented for cutting. Wherein, said automated saw 100 can cut one or more meat portion configurations 602 from said uncut meat 202 having classified what cuts of meat are being cut.

Figure 6A:
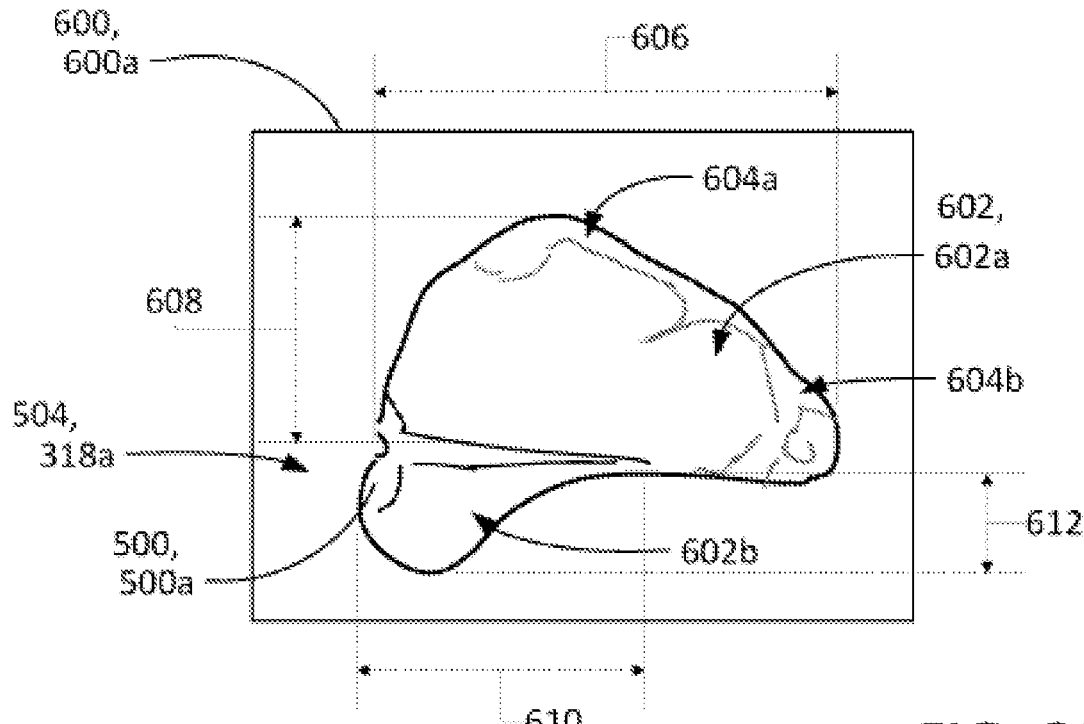
FIGS. 6A and 6B illustrate an elevated front view of a first slice image 600a and a second slice image 600b, respectively.
Figure 6B:
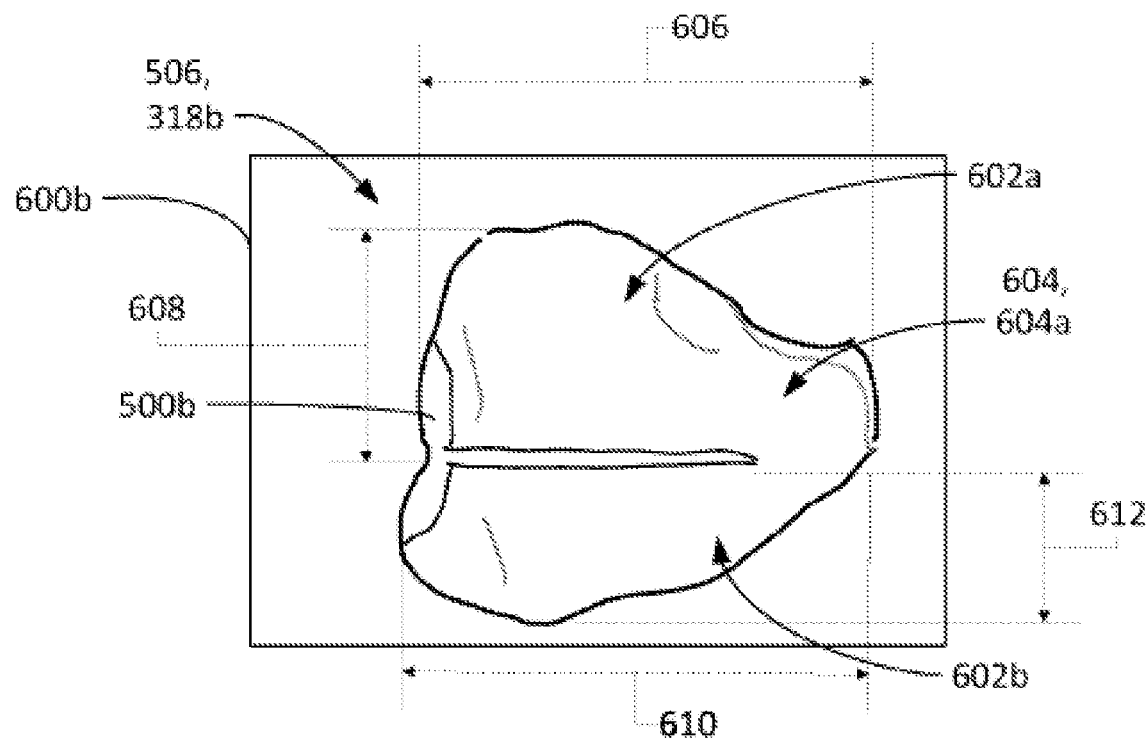

FIGS. 6A and 6B illustrate an elevated front view of a first slice image 600a and a second slice image 600b, respectively.

In one embodiment, said automated saw 100 can capture said one or more slice images 600 with said one or more visual sensors 112. In one embodiment, said one or more slice images 600 can comprise visual images, as is known in the art. In one embodiment, said one or more slice images 600 can capture light and data not visible to the human eye, such as IR and heat signals.

Figure 7:
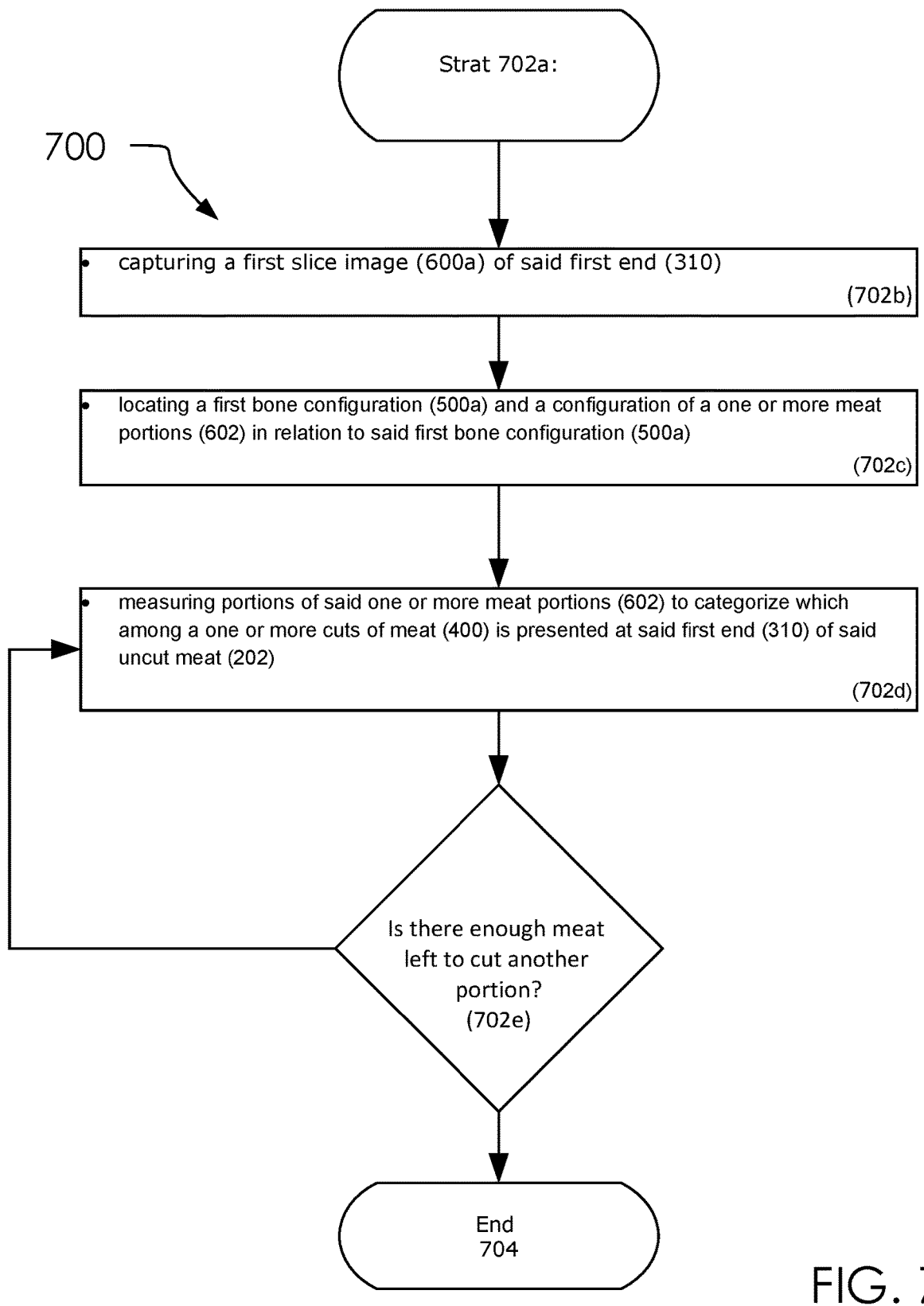
FIG. 7 illustrates a method of use 700 for said automated saw 100.

FIG. 7 illustrates a method of use 700 for said automated saw 100.

In one embodiment, said automated saw 100 using said device application 1200 can be configured for analyzing said first end 214 of said uncut meat 202 by: capturing said first slice image 600a of said first end 214, locating a first bone configuration 500a and a configuration of said one or more meat portion configurations 602 in relation to said first bone configuration 500a, and measuring portions of said one or more meat portion configurations 602 to categorize which among said one or more cuts of meat categorizations 400 is presented at said first end 214 of said uncut meat 202. Further, said automated saw 100 can calculate a first cutting depth 322a for a first meat portion 602a. In one embodiment, said automated saw 100, using said device application 1200, can be configured to receive preference inputs s for various said one or more cuts of meat categorizations 400 and corresponding one or more cutting depths 322; wherein, for example, said first cutting depth 322a can correspond to said first cut of meat 400a and a second cutting depth 322b to said second cut of meat 400b. A butcher might, for example, prefer different thicknesses for said T-bone cut 504 and said porterhouse cut 506.

In one embodiment, said one or more slice images 600 can comprise at least said first slice image 600a and said second slice image 600b.

Figure 8:
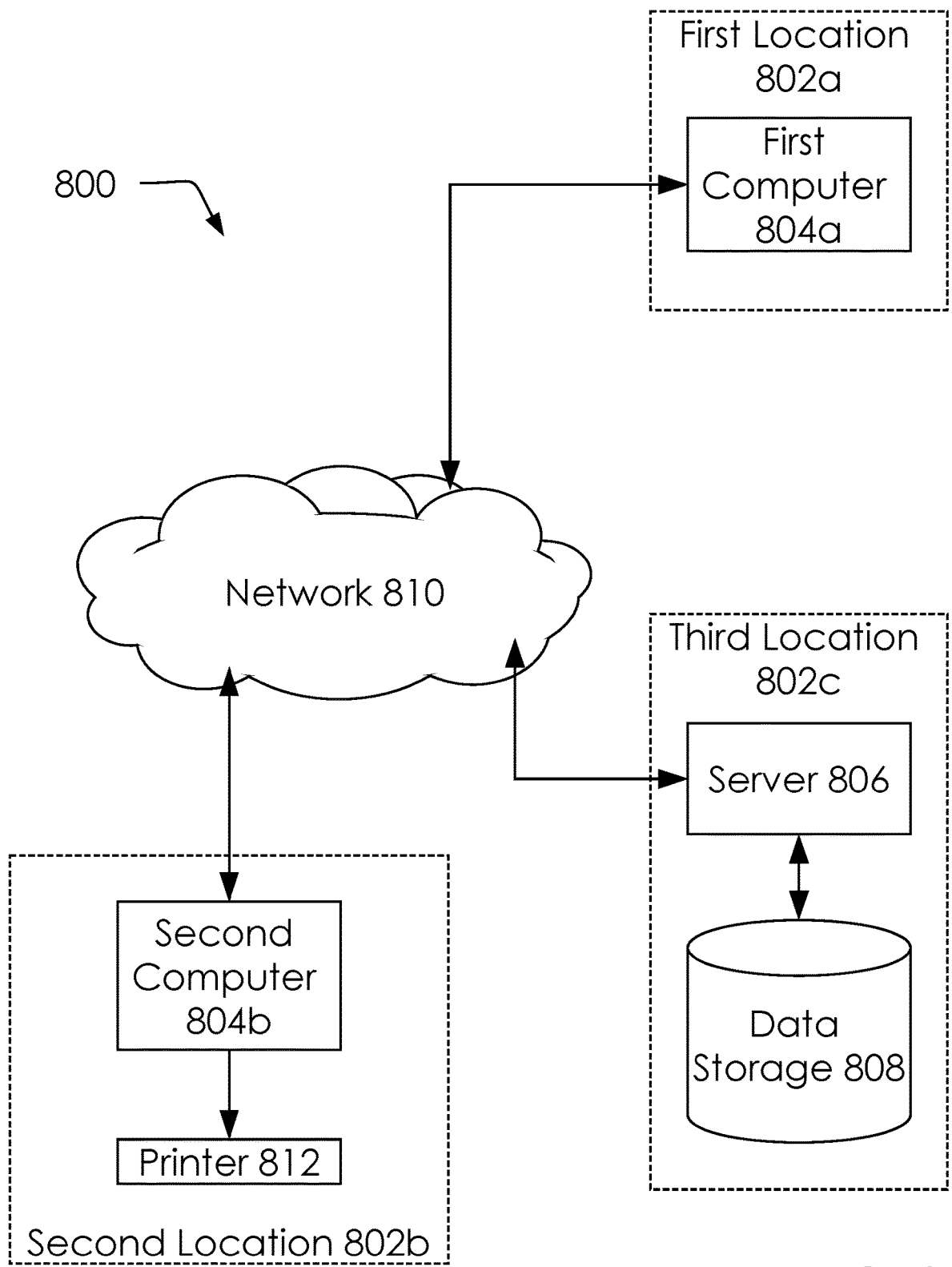
FIG. 8 illustrates a network diagram 800.

FIG. 8 illustrates a network diagram 800.

In one embodiment, said network diagram 800 can comprise said one or more computers 804, one or more locations 802, and a network 810. In one embodiment, said one or more locations 802 can comprise a first location 802a, a second location 802b and a third location 802c. Said one or more computers 804 can comprise a first computer 804a, and a second computer 804b In one embodiment, said server 806 can communicate with said one or more computers 804 over said network 810. Said one or more computers 804 can be attached to a printer 812 or other accessories, as is known in the art.

In one embodiment, said server 806 can attach to a data storage 808.

In one embodiment, said printer 812 can be hardwired to said first computer 804a (not illustrated here), or said printer 812 can connect to one of said one or more computers 804 (such as said second computer 804b, as illustrated) via said network 810.

Said network 810 can be a local area network (LAN), a wide area network (WAN), a piconet, or a combination of LANs, WANs, or piconets. One illustrative LAN is a network within a single business. One illustrative WAN is the Internet.

In one embodiment, said server 806 represents at least one, but can be many servers, each connected to said network 810. Said server 806 can connect to said data storage 808. Said data storage 808 can connect directly to said server 806, as shown in FIG. 1, or may exist remotely on said network 810. In one embodiment, said data storage 808 can comprise any suitable long-term or persistent storage device and, further, may be separate devices or the same device and may be collocated or distributed (interconnected via any suitable communications network).

FIGS. 9A, 9B, 9C, 9D and 9E illustrate a mobile phone 900a, a personal computer 900b, a tablet 900c, a smart watch 900d and a smart phone 900e, respectively.

In one embodiment, said one or more computers 804 can comprise said mobile phone 900a, said personal computer 900b, said tablet 900c, said smart watch 900d or said smart phone 900e. In one embodiment, each among said one or more computers 804 can comprise one or more input devices 904, a keyboard 904a, a trackball 904b, one or more cameras 904c, a track pad 904d, a data 906 and/or a home button 908, as is known in the art.

In the last several years, the useful definition of a computer has become more broadly understood to include mobile phones, tablet computers, laptops, desktops, and similar. For example, Microsoft®, have attempted to merge devices such as a tablet computer and a laptop computer with the release of "Windows® 8". In one embodiment, said one or more computers each can include, but is not limited to, a laptop (such as said personal computer 900b), desktop, workstation, server, mainframe, terminal, a tablet (such as said tablet 900c), a phone (such as said mobile phone 900a), and/or similar. Despite different form-factors, said one or more computers can have similar basic hardware, such as a screen 902 and said one or more input devices 904 (such as said keyboard 904a, said trackball 904b, said one or more cameras 904c, a wireless—such as RFID—reader, said track pad 904d, and/or said home button 908). In one embodiment, said screen 902 can comprise a touch screen. In one embodiment, said track pad 904d can function similarly to a computer mouse as is known in the art. In one embodiment, said tablet 900c and/or said personal computer 900b can comprise a Microsoft® Windows® branded device, an Apple® branded device, or similar. In one embodiment, said tablet 900c can be an X86 type processor or an ARM type processor, as is known in the art.

Said network diagram 100 can comprise said data 906. In one embodiment, said data 906 can comprise data related to financial transactions.

In one embodiment, said one or more computers can be used to input and view said data 906. In one embodiment, said data 906 can be input into said one or more computers by taking pictures with one of said one or more camera 204c, by typing in information with said keyboard 904a, or by using gestures on said screen 902 (where said screen 902 is a touch screen). Many other data entries means for devices like said one or more computers are well known and herein also possible with said data 906. In one embodiment, said first computer 102a can comprise an iPhone®, a BlackBerry®, a smartphone, or similar. In one embodiment, said one or more computers 804 can comprise a laptop computer, a desktop computer, or similar.

Figure 10A:
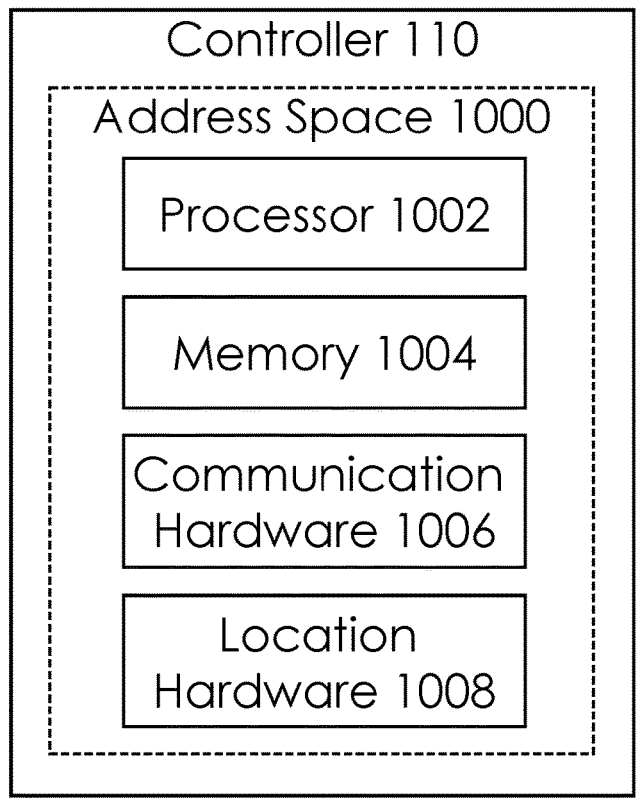
FIGS. 10A, 10B and 10C illustrate an address space 1000, an address space 1000a and an address space 1000e, respectively.
Figure 10B:
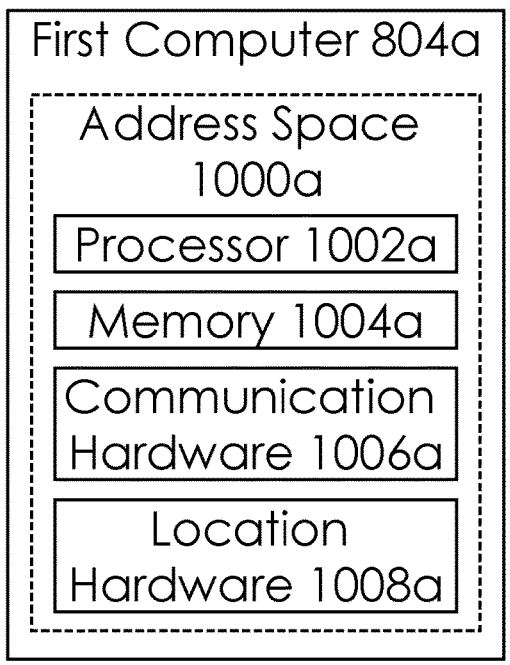
Figure 10C:
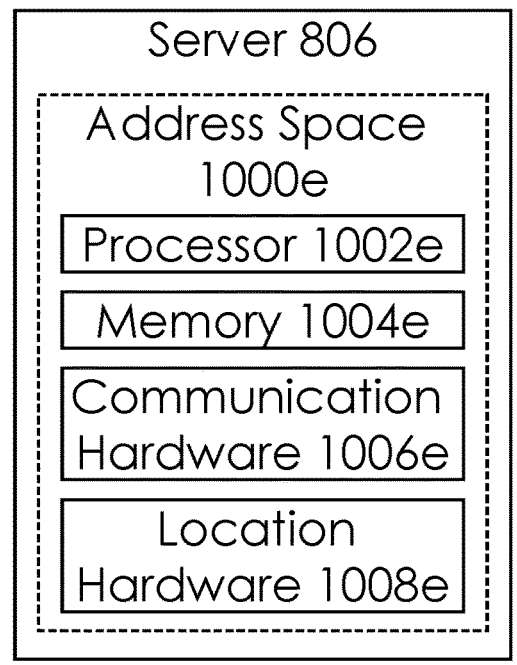

FIGS. 10A, 10B and 10C illustrate said address space 1000, an address space 1000a and an address space 1000e, respectively.

In one embodiment, said one or more computers 804 can comprise said address space 1000, and more specifically, said first computer 804a can comprise said address space 1000a, and so on. In turn, each among said address space 1000 can comprise said processor 1002, said memory 1004, said communication hardware 1006 and a location hardware 1008. Thus, said address space 1000a a processor 1002a, a memory 1004a, a communication hardware 1006a and a location hardware 1008a; and said address space 1000e can comprise a processor 1002e, a memory 1004e, a communication hardware 1006e and a location hardware 1008e.

Each among said one or more computers 804 and said server 806 can comprise an embodiment of said address space 1000. In one embodiment, said processor 1002 can comprise a plurality of processors, said memory 1004 can comprise a plurality of memory modules, and said communication hardware 1006 can comprise a plurality of communication hardware components. In one embodiment, said data 906 can be sent to said processor 1002; wherein, said processor 1002 can perform processes on said data 906 according to an application stored in said memory 1004, as discussed further below. Said processes can include storing said data 906 into said memory 1004, verifying said data 906 conforms to one or more preset standards, or ensuring a required set among said required said data 906 has been gathered for said data management system and method. In one embodiment, said data 906 can include data which said one or more computers 804 can populate automatically, such as a date and a time, as well as data entered manually. Once a portion of gathering data has been performed said data 906 can be sent to said communication hardware 1006 for communication over said network 810. Said network 810 can include a network transport processor for packetizing data, communication ports for wired communication, or an antenna for wireless communication. In one embodiment, said data 906 can be collected in one or more computers and delivered to said server 806 through said network 810.

With reference to said controller 110, which is at least a computer under the foregoing definition, said controller 110 can comprise said address space 1000 having said processor 1002, said memory 1004, said communication hardware 1006, and said location hardware 1008.

Figure 11A:
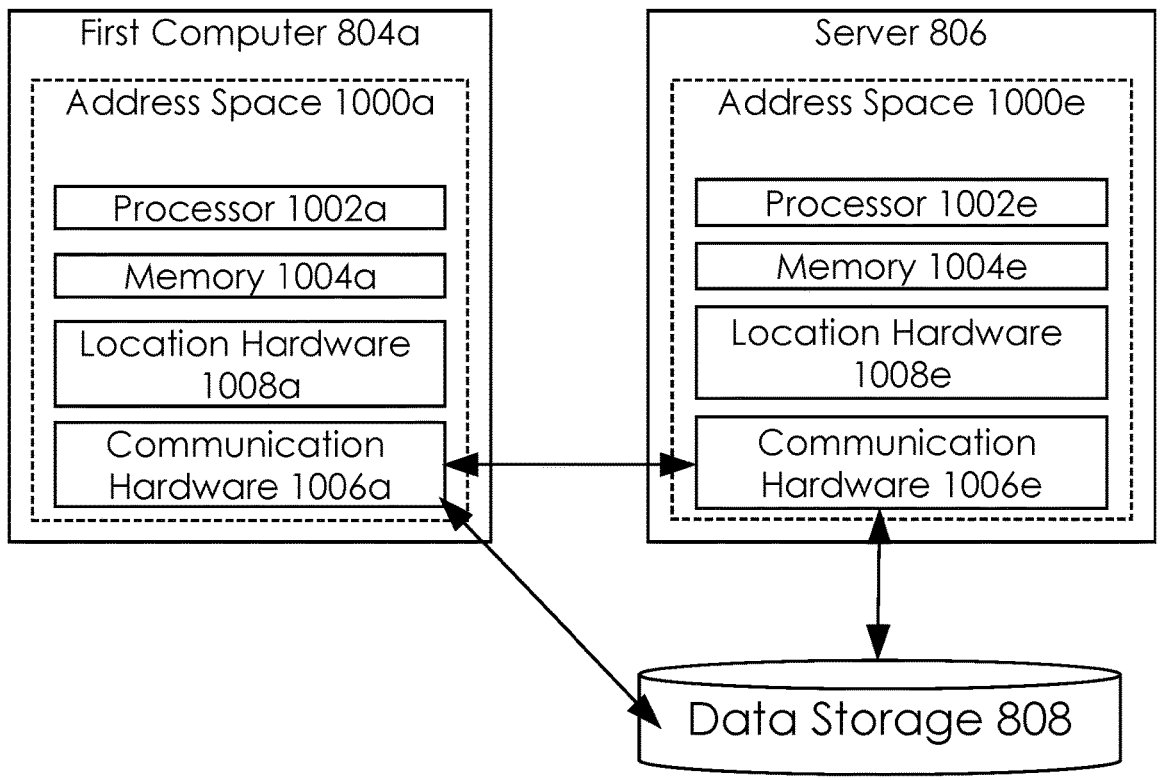
FIGS. 11A and 11B illustrate a flow chart between one or more computers 804 and a server 806.
Figure 11B:
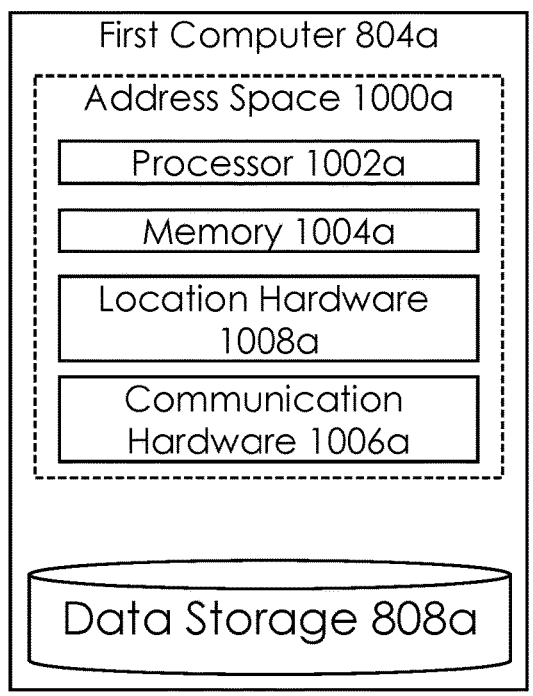

FIGS. 11A and 11B illustrate a flow chart between said one or more computers 804 and said server 806.

In the first embodiment, said communication hardware 1006a and said communication hardware 1006e can send and receive said data 906 to and from one another and or can communicate with said data storage 808 across said network 810. Likewise, in the second embodiment, said data storage 808 can be embedded inside of said one or more computers 804, which may speed up data communications over said network 810.

As illustrated in FIG. 4A, in one embodiment, said server 806 can comprise a third-party data storage and hosting provider or privately managed as well.

As illustrated in FIG. 4B, a data storage 808a can be located on said first computer 804a. Thus, said first computer 804a can operate without a data connection out to said server 806.

Figure 12A:
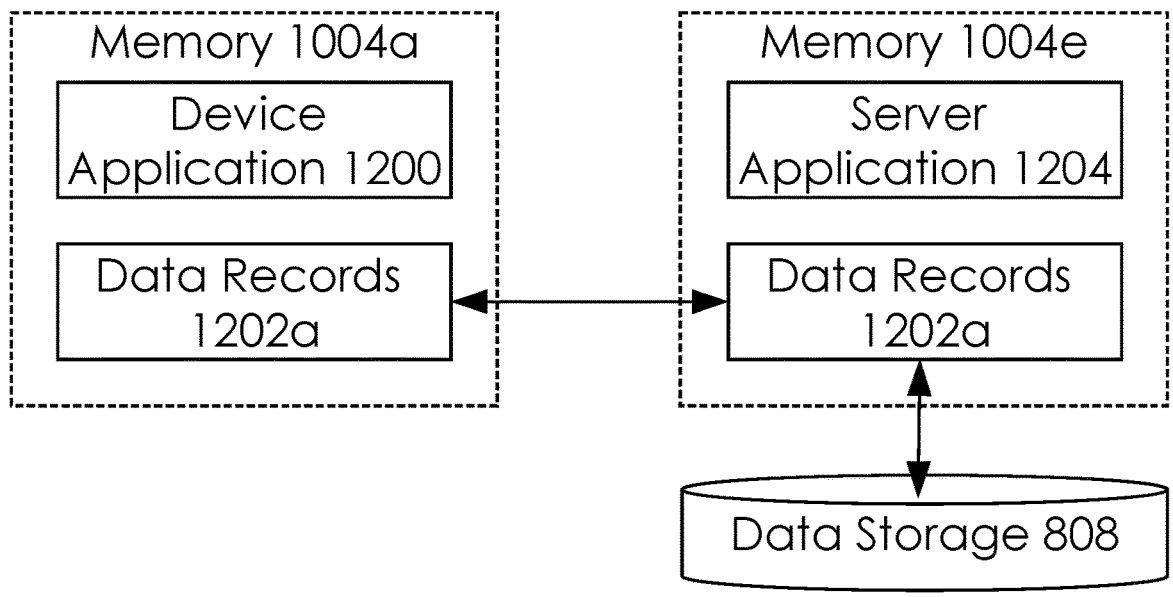
FIGS. 12A and 12B illustrate interactions between a device application 1200, a server application 1204 and a data storage 808.
Figure 12B:
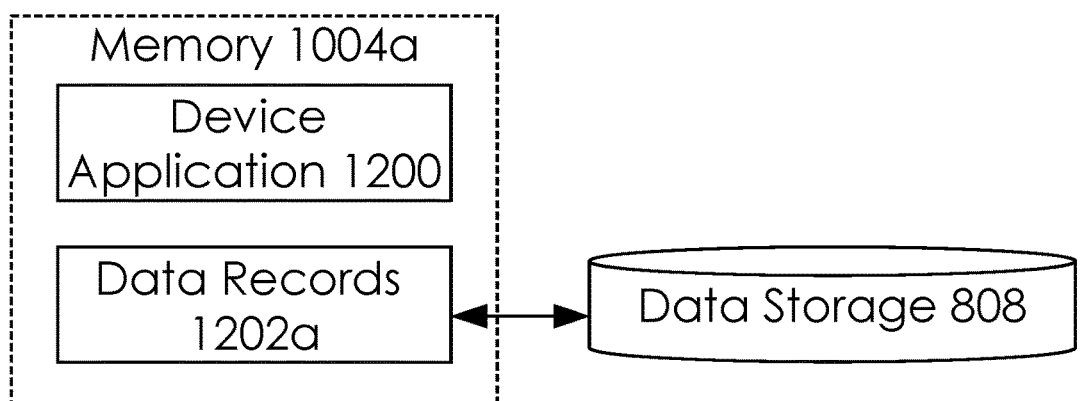

FIGS. 12A and 12B illustrate interactions between said device application 1200, a server application 1204 and said data storage 808.

For nomenclature, each among data records can comprise a set of data records in use on said one or more computers 804; thus, said first computer 804a can comprise a data records 1202a, and so on.

The following sentences comprise a summary of the original claims.

Said automated saw 100 configured to analyze said uncut meat 202 and calculate said one or more cutting depths 322 for said one or more cut portions 318 from said uncut meat 202 based on a current cut of meat wherein: said automated saw 100 comprises said controller 110 and said one or more visual sensors 112. Said controller 110 comprises said address space 1000, said processor 1002 and said memory 1004. Said controller 110 further comprises said device application 1200 stored in said memory 1004 and configured to be executed in said memory 1004. Said uncut meat 202 comprises said first end 214 and said second end 216. Said device application 1200 can be configured to analyze said uncut meat 202. Said first end 214 of said uncut meat 202 can be analyzed by said device application 1200 by: capturing said first slice image 600a of said first end 214 of said uncut meat 202 using said one or more visual sensors 112, locating in said first slice image 600a, said one or more bone configurations 500 and said one or more meat portion configurations 602 in relation to one another, and categorizing a current cut of meat categorization among said one or more cuts of meat categorizations 400 according to locations of said one or more bone configurations 500 and said one or more meat portion configurations 602 in said first slice image 600a.

Said one or more visual sensors 112 comprises said first visual sensor 122 and said second visual sensor 124. Said first visual sensor 122 has an overview perspective of said uncut meat 202. Said device application 1200 can be configured to calculate said uncut meat length 316 of said uncut meat 202 using images from said first visual sensor 122. Said second visual sensor 124 comprises a view of said first end 214 of said uncut meat length 316. Said automated saw 100 captures an image of said one or more slice images 600 of said uncut meat length 316 using said second visual sensor 124. Said device application 1200 can be configured to calculate said one or more cutting depths 322 for said one or more cuts of meat categorizations 400 corresponding to a preference for each category of said one or more cuts of meat categorizations 400.

Said automated saw 100 further comprises said conveyor 104, said meat positioning assembly 114, and said bandsaw blade 120. Said meat positioning assembly 114 comprises said pusher 116, and said tray 118. Said tray 118 can be configured to move toward and away from said pushing direction 212 relative to said bandsaw blade 120. Said pusher 116 can be configured to push portions of said uncut meat 202 toward and past said bandsaw blade 120.

Said device application 1200 can be configured to select a current cutting depth for a current cut of meat categorization, and move 118/to as to position said uncut meat 202 for cutting by said bandsaw blade 120.

Said device application 1200 can be configured for: analyzing a current image among said one or more slice images 600, characterizing aspects of and end portion of said uncut meat 202 to classify what cut of meat can be presented for cutting. Said automated saw 100 can be configured to cut said one or more meat portion configurations 602 from said uncut meat 202 having classified what cuts of meat can be being cut.

Said automated saw 100 using said device application 1200 can be configured for analyzing said first end 214 of said uncut meat 202 by: capturing said first slice image 600a of said first end 214, locating said first bone configuration 500a and a configuration of said one or more meat portion configurations 602 in relation to said first bone configuration 500a, and measuring portions of said one or more meat portion configurations 602 to categorize which among said one or more cuts of meat categorizations 400 can be presented at said first end 214 of said uncut meat 202.

LISTING OF THE PARTS said automated saw 100,
Said base 102,
Said conveyor 104,
Said post 106,
Said overhang portion 108,
Said controller 110,
Said one or more visual sensors 112,
Said meat positioning assembly 114,
Said pusher 116,
Said tray 118,
Said bandsaw blade 120,
Said first visual sensor 122,
Said second visual sensor 124,
Said one or more computers 804,
Said server 806,
Said address space 1000,
Said processor 1002,
Said memory 1004,
Said communication hardware 1006,
Said uncut meat 202,
Said first horizontal direction 204,
Said second horizontal direction 206,
Said pushing direction 212,
Said first end 214,
Said second end 216,
Said cutting end 218,
Said cutting plane 314,
Said device application 1200,
Said diameter 306,
Said surface area 302,
Said one or more cut portions 318,
Said uncut meat length 316,
Said uncut meat weight 304,
Said scale 300,
Said first cut portion 318a,
Said second cut portion 318b,
Said cut portion weight 320,
Said one or more cuts of meat categorizations 400,
Said first cut of meat 400a,
Said second cut of meat 400b,
Said short loin 502,
Said T-bone cut 504,
Said porterhouse cut 506,
Said one or more bone configurations 500,
Said one or more slice images 600,
Said one or more meat portion configurations 602,
Said first slice image 600a,
Said second slice image 600b,
Said method of use 700,
Said first bone configuration 500a,
Said first cutting depth 322a,
Said first meat portion 602a,
Said one or more cutting depths 322,
Said second cutting depth 322b,
Said network diagram 800,
Said one or more locations 802,
Said network 810,
Said first location 802a,
Said second location 802b,
Said third location 802c,
Said first computer 804a,
Said second computer 804b,
Said printer 812,
Said data storage 808,
Said mobile phone 900a,
Said personal computer 900b,
Said tablet 900c,
Said smart watch 900d,
Said smart phone 900e,
Said one or more input devices 904,
Said keyboard 904a,
Said trackball 904b,
Said one or more cameras 904c,
Said track pad 904d,
Said data 906,
Said home button 908,
Said screen 902,
Said address space 1000a,
Said address space 1000e,
Said location hardware 1008,
Said processor 1002a,
Said memory 1004a,
Said communication hardware 1006a,
Said location hardware 1008a,
Said processor 1002e,
Said memory 1004e,
Said communication hardware 1006e,
Said location hardware 1008e,
Said data storage 808a,
Said server application 1204, and
said data records 1202a.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An automated saw configured to analyze an uncut meat and calculate one or more cutting depths for one or more cut portions from said uncut meat based on a current cut of meat; wherein:

said automated saw comprises a controller and one or more visual sensors;

said controller comprises an address space, a processor and a memory;
said controller further comprises a device application stored in said memory and configured to be executed in said memory;
said uncut meat comprises a first end and a second end;
said device application is configured to analyze said uncut meat;
said first end of said uncut meat can be analyzed by said device application by:
  capturing a first slice image of said first end of said uncut meat using said one or more visual sensors,
  locating in said first slice image, one or more bone configurations and one or more meat portion configurations in relation to one another, and
  categorizing a current cut of meat categorization among one or more cuts of meat categorizations according to locations of said one or more bone configurations and said one or more meat portion configurations in said first slice image;
said one or more visual sensors comprises a first visual sensor and a second visual sensor;
said first visual sensor has an overview perspective of said uncut meat;
said device application is configured to calculate an uncut meat length of said uncut meat using images from said first visual sensor;
said second visual sensor comprises a view of said first end of said uncut meat length;
said automated saw captures an image of one or more slice images of said uncut meat length using said second visual sensor; and
said device application is configured to calculate said one or more cutting depths for said one or more cuts of meat categorizations corresponding to a preference for each category of said one or more cuts of meat categorizations.

2. The automated saw of claim 1, wherein:
said automated saw further comprises a conveyor, a meat positioning assembly, and a bandsaw blade;
said meat positioning assembly comprises a pusher, and a tray;
said tray is configured to move toward and away from a pushing direction relative to said bandsaw blade; and
said pusher is configured to push portions of said uncut meat toward and past said bandsaw blade.

3. The automated saw of claim 2, wherein:
said device application is configured to select a current cutting depth for a current cut of meat categorization, and move 118/to as to position said uncut meat for cutting by said bandsaw blade.

4. An automated saw configured to analyze an uncut meat and calculate one or more cutting depths for one or more cut portions from said uncut meat based on a current cut of meat; wherein:
said automated saw comprises a controller and one or more visual sensors;
said controller comprises an address space, a processor and a memory;
said controller further comprises a device application stored in said memory and configured to be executed in said memory;
said uncut meat comprises a first end and a second end;
said device application is configured to analyze said uncut meat;
said first end of said uncut meat can be analyzed by said device application by:
  capturing a first slice image of said first end of said uncut meat using said one or more visual sensors,
  locating in said first slice image, one or more bone configurations and one or more meat portion configurations in relation to one another, and
  categorizing a current cut of meat categorization among one or more cuts of meat categorizations according to locations of said one or more bone configurations and said one or more meat portion configurations in said first slice image.

5. The automated saw of claim 4, wherein:
said one or more visual sensors comprises a first visual sensor and a second visual sensor;
said first visual sensor has an overview perspective of said uncut meat;
said device application is configured to calculate an uncut meat length of said uncut meat using images from said first visual sensor;
said second visual sensor comprises a view of said first end of said uncut meat length;
said automated saw captures an image of one or more slice images of said uncut meat length using said second visual sensor; and
said device application is configured to calculate said one or more cutting depths for said one or more cuts of meat categorizations corresponding to a preference for each category of said one or more cuts of meat categorizations.

6. The automated saw of claim 5, wherein:
said automated saw further comprises a conveyor, a meat positioning assembly, and a bandsaw blade;
said meat positioning assembly comprises a pusher, and a tray;
said tray is configured to move toward and away from a pushing direction relative to said bandsaw blade; and
said pusher is configured to push portions of said uncut meat toward and past said bandsaw blade.

7. The automated saw of claim 6, wherein:
said device application is configured to select a current cutting depth for a current cut of meat categorization, and move 118/to as to position said uncut meat for cutting by said bandsaw blade.

8. The automated saw of claim 4, wherein:
said device application is configured for:
  analyzing a current image among said one or more slice images, characterizing aspects of and end portion of said uncut meat to classify what cut of meat is presented for cutting; and
said automated saw is configured to cut said one or more meat portion configurations from said uncut meat having classified what cuts of meat are being cut.

9. The automated saw of claim 4, wherein:
said automated saw using said device application is configured for analyzing said first end of said uncut meat by:
  capturing said first slice image of said first end,
  locating a first bone configuration and a configuration of said one or more meat portion configurations in relation to said first bone configuration, and
  measuring portions of said one or more meat portion configurations to categorize which among said one or more cuts of meat categorizations is presented at said first end of said uncut meat.

10. The automated saw of claim 9, wherein:
said one or more visual sensors comprises said first visual sensor and said second visual sensor;

said first visual sensor has an overview perspective of said uncut meat length;

said automated saw, using said device application, calculates said uncut meat length;

said second visual sensor comprises a view of said first end of said uncut meat length;

said automated saw captures an image of said one or more slice images of said uncut meat length using said second visual sensor;

said automated saw, using said device application, is configured to calculate a first cutting depth for a first meat portion;

said automated saw is configured to receive preference inputs related to said one or more cuts of meat categorizations and corresponding said one or more cutting depths; and said first cutting depth can correspond to a first cut of meat and a second cutting depth to a second cut of meat.

11. An automated saw configured to analyze an uncut meat and calculate one or more cutting depths for one or more cut portions from said uncut meat based on a current cut of meat; wherein:

said automated saw comprises a controller and one or more visual sensors;

said controller comprises an address space, a processor and a memory;

said controller further comprises a device application stored in said memory and configured to be executed in said memory;

said uncut meat comprises a first end and a second end;

said device application is configured to analyze said uncut meat;

said first end of said uncut meat can be analyzed by said device application by:

capturing a first slice image of said first end of said uncut meat using said one or more visual sensors, locating in said first slice image, one or more bone configurations and one or more meat portion configurations in relation to one another, and categorizing a current cut of meat categorization among one or more cuts of meat categorizations according to locations of said one or more bone configurations and said one or more meat portion configurations in said first slice image; and said automated saw using said device application is configured for analyzing said first end of said uncut meat by:

capturing said first slice image of said first end, locating a first bone configuration and a configuration of said one or more meat portion configurations in relation to said first bone configuration, and measuring portions of said one or more meat portion configurations to categorize which among said one or more cuts of meat categorizations is presented at said first end of said uncut meat.

12. The automated saw of claim 11, wherein:

said one or more visual sensors comprises a first visual sensor and a second visual sensor;

said first visual sensor has an overview perspective of an uncut meat length;

said automated saw, using said device application, calculates said uncut meat length;

said second visual sensor comprises a view of said first end of said uncut meat length;

said automated saw captures an image of one or more slice images of said uncut meat length using said second visual sensor;

said automated saw, using said device application, is configured to calculate a first cutting depth for a first meat portion;

said automated saw is configured to receive preference inputs related to said one or more cuts of meat categorizations and corresponding said one or more cutting depths; and said first cutting depth can correspond to a first cut of meat and a second cutting depth to a second cut of meat.

* * * * *